US005475537A

United States Patent [19]
Kobayashi et al.

[11] Patent Number: 5,475,537
[45] Date of Patent: Dec. 12, 1995

[54] OPTICAL SYSTEM FOR USE IN RECORDING AND READING INFORMATION ON AN OPTICAL INFORMATION MEDIUM

[75] Inventors: Masaya Kobayashi; Kaoru Kushida; Norikazu Arai, all of Hachioji, Japan

[73] Assignee: Konica Corporation, Tokyo, Japan

[21] Appl. No.: 202,485

[22] Filed: Feb. 28, 1994

[30] Foreign Application Priority Data

Mar. 5, 1993 [JP] Japan ..................... 5-069112

[51] Int. Cl.$^6$ ..................... G02B 9/06
[52] U.S. Cl. ..................... 359/794; 359/795; 359/717; 359/368
[58] Field of Search ..................... 359/368, 708, 359/717, 793, 794, 795

[56] References Cited

U.S. PATENT DOCUMENTS 4,525,040  6/1985  Nakamura ..................... 359/794

FOREIGN PATENT DOCUMENTS 57-76512  5/1982  Japan .
61-56314  3/1986  Japan .
62-43842  2/1987  Japan .

OTHER PUBLICATIONS

English language abstract of Japanese Patent Publication Open to Public Inspection No. 76512/1982.
English language abstract of Japanese Patent Publication Open to Public Inspection No. 56314/1986.
English language abstract of Japanese Patent Publication Open to Public Inspection No. 43842/1987.

Primary Examiner—Georgia Y. Epps
Assistant Examiner—Thomas D. Robbins
Attorney, Agent, or Firm—Finnegan, Henderson, Farabow, Garrett & Dunner

[57] ABSTRACT

An optical system for recording and reading information on an optical information medium such as a video disk, a mini disk, a magneto-optical disk, and a phase change disk. The optical system includes: a light source for irradiating the optical information medium with a light beam through a coupling lens and a objective lens; the coupling lens which is a spherical single lens; and the objective lens which is a double-sided aspherical lens and provided movable along an optical axis of the light source; in which the light source is located between the coupling lens and a focal point, at a side of the light source, of the coupling lens. The optical system defines the number of a numerical aperture on the side of the optical information medium, and a lateral magnification ratio of the optical system.

4 Claims, 12 Drawing Sheets

FIG. 2 (a) PRIOR ART
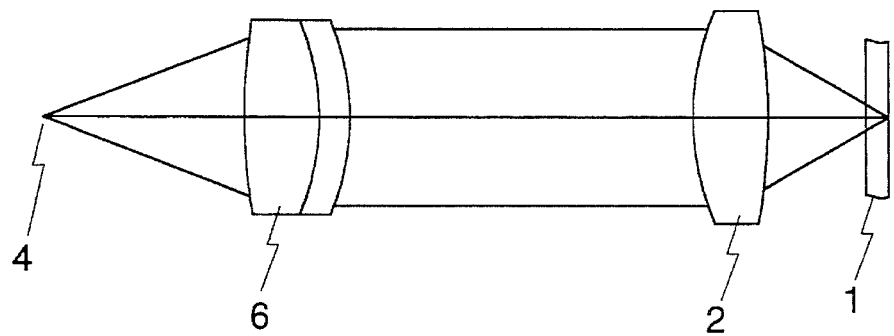
FIG. 2 (b) PRIOR ART
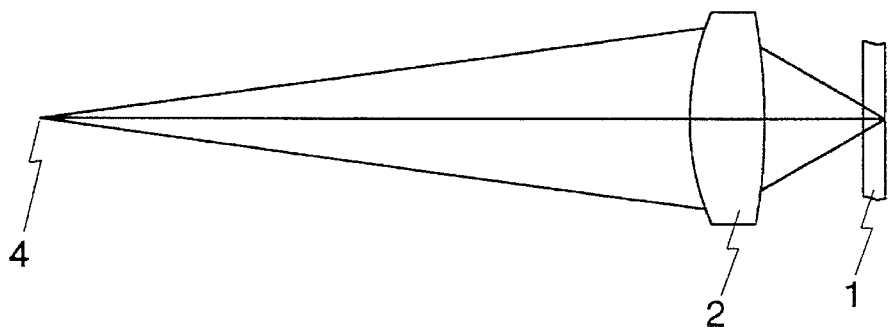
FIG. 2 (c) PRIOR ART
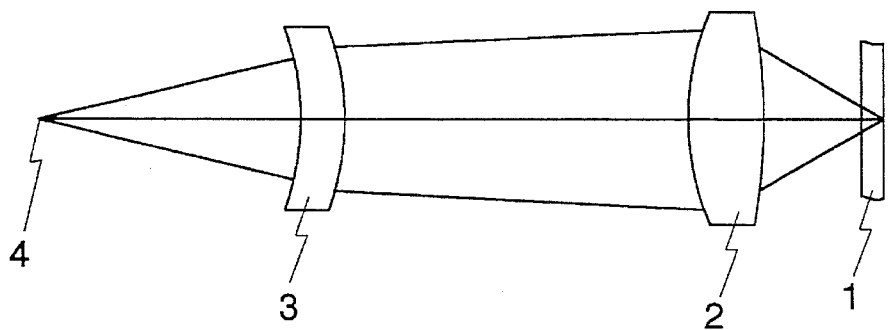

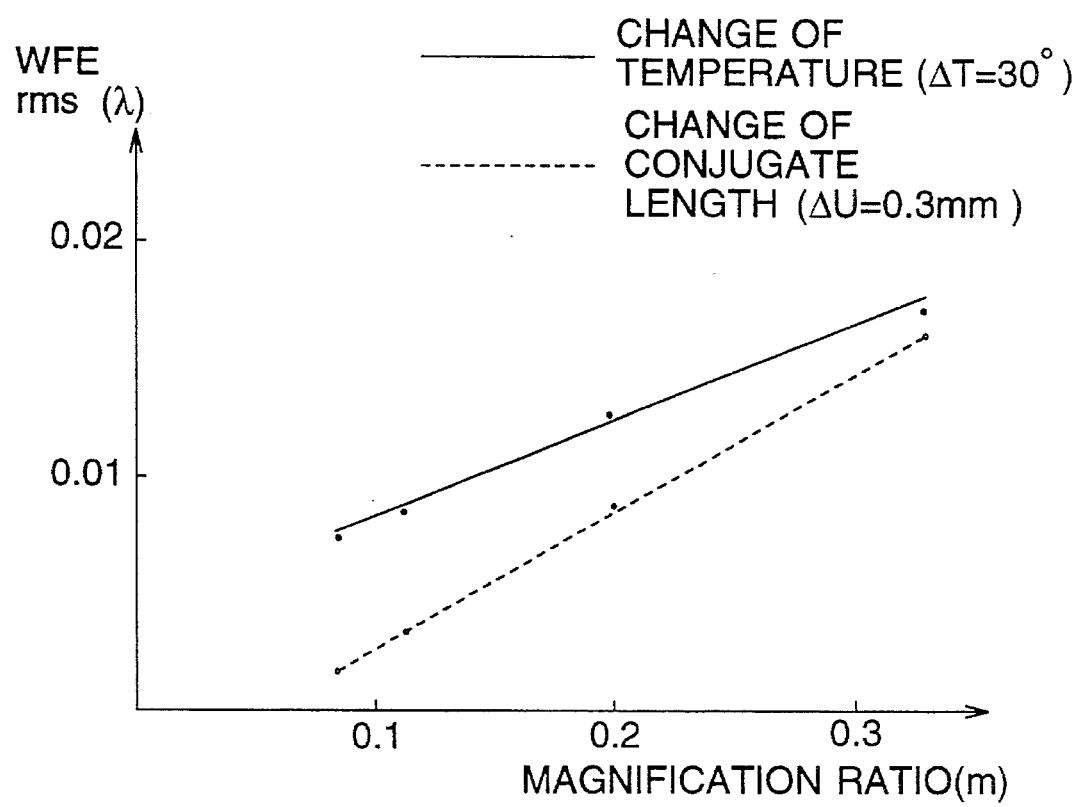

FIG. 4
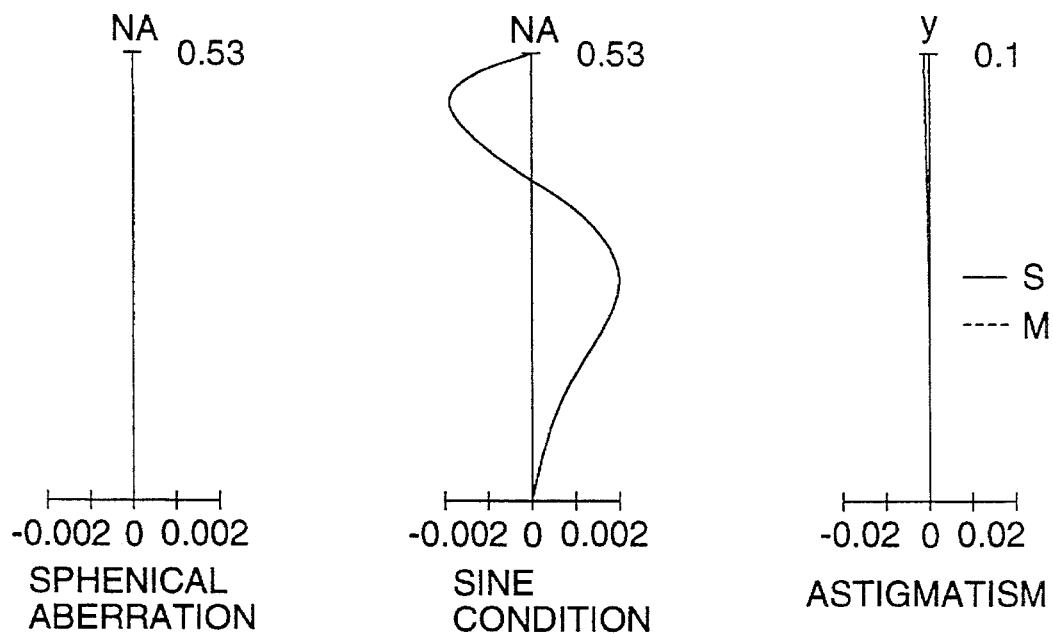
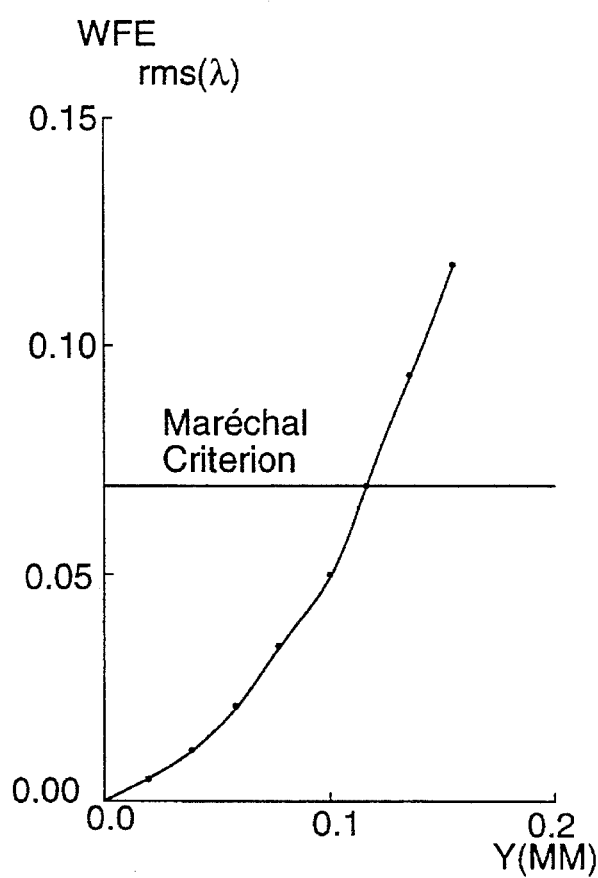

OPTICAL SYSTEM FOR USE IN RECORDING AND READING INFORMATION ON AN OPTICAL INFORMATION MEDIUM

BACKGROUND OF THE INVENTION

The present invention relates to an optical system for use with recording and reading information on an optical information medium, and particularly to an optical system, for use with recording and reading information on an optical information medium, the optical system comprising a coupling lens for an objective lens having a large numerical aperture.

Recently, in accompanied with a rapid growth of a recording and reading apparatus for an optical information medium, such as a compact disk (CD), it is greatly desired that the cost of the optical system of the apparatus is lowered, and the size of the optical system is made smaller, and therefore, various improvements are conducted on the optical system. The results of the technical improvements of the optical system are shown in FIG. 2.

The numerical aperture (NA) of an objective lens for the CD is lower than 0.45. Emitted light beams from a light source 4, such as a semiconductor laser or the like, are in parallel through a collimator lens 6, and an image is formed on the optical information medium 1 by the objective lens. Initially, as shown in FIG. 2(a), manufacture of the objecting lens with a single lens was tried (for example, refer to Japanese Patent Publication Open to Public inspection No. 76512/1982). However, since a collimator lens 6 comprises two spherical lenses, it is further desired to reduce the cost of the collimator lens.

According to the progress of manufacturing engineering of the objective lens, the following optical system was developed in which: as shown in FIG. 2(b), the collimator lens is removed; and an image of a light beam flux from the light source is directly formed on the optical information medium by one objective lens having an object point and an image point at a definite distance (for example, refer to Japanese Patent Publication Open to Public Inspection No. 56314/1986). Recently, this type objective lenses are used for many CDs.

Further, the following proposal has been made: in order to reduce the total length of the optical system and to increase the utilization efficiency, a coupling lens 3 comprising a spherical single lens is used in the optical system as shown in FIG. 2(c); image formation magnification of the coupling lens is made larger than zero; and wave surface aberration is lowered to that of the conventional collimator lens (refer to Japanese Patent Publication Open to Public Inspection No. 43842/1987).

In the optical system for recording and reading information which is recently being developed, the most popular optical system is structured with one objective lens as shown in FIG. 2(b). However, the NA of the optical system to which this optical system can be applied, is smaller than 0.45, and when the NA is greater than 0.47, the optical system shown in FIG. 2(a) must still be used.

When the NA is greater than 0.47, and if it is desired to use the optical system shown in FIG. 2(b), the following problems occur.

Initially, the distance from the light source to the optical information recording surface (distance between the object and image) U is determined by design conditions. However, practically, deviation $\Delta U$ of the distance U is caused by deflection of the optical information medium. At the present time, in this type of apparatus, when the deviation $\Delta U$ occurs within an available magnification ratio, the optical system is controlled such that the objective lens is moved along the optical axis and the image is automatically focused on the surface of the optical information medium. However, aberration is caused by the aforementioned deviation.

The aberration consists mainly of spherical aberration, and an amount of which is proportional to the fourth power of the NA. The amount of the aberration is further proportional to $\Delta U$, and to the function in which an absolute value $|m|$ of a lateral magnification ratio of the optical system is variable.

When the amount of the aberration caused by $\Delta U$ is defined as Wu, and the function in which the absolute value $|m|$ of the lateral magnification ratio is variable, is defined as $\alpha(|m|)$, then the $\alpha(|m|)$ is a monotone increasing function of the variable $|m|$, and the Wu is expressed by the following equation:

$$Wu = \alpha(|m|) \cdot (NA)^4 \cdot \Delta U \tag{1}$$

Although this aberration also occurs in the case where the NA of the optical system for the CD is approximately 0.45, the level of aberration is negligible. However, in the case where the NA of the optical system is more than 0.47, the aberration can not be ignored.

When an automatic focusing operation is conducted under the condition that the objective lens is integrated with the light source, the foregoing problem does not occur. However the apparatus surrounding the optical system becomes complicated and cost is unavoidably increased.

In the case of a resin objective lens, the influence due to its temperature characteristics must be considered as another problem.

Generally, when temperature is changed, a change in the refractive index of a resin lens is 10 times as large as that of glass lens. Accordingly, in the case of the resin lens, when there is a temperature difference $\Delta T$ between a reference temperature in design and that of a practical environment, the aberration Wt occurs.

This aberration mainly includes spherical aberration, and is proportional to the fourth power of the NA, a focal distance f, $\Delta T$, and a monotone increasing function $\beta(|m|)$ in which an absolute value $|m|$ of the lateral magnification is variable.

$$Wt = \beta(|m|) \cdot (NA)^4 \cdot f \cdot \Delta T \tag{2}$$

Even when lenses with the same focal distance and NA have the same $\Delta U$ or $\Delta T$, an aberration amount Wu or a value of Wt changes due to the lateral magnification of the optical system.

For example, an optical system for a video disk reading apparatus is assumed as an example, in which the lens has the NA of 0.5 and a focal distance of 1 mm.

Here, the distance between the object and the image can be expressed as follows.

$$U = \{|m| = (1/|m|) + 2\} \cdot f + HH'. \tag{3}$$

Where, m is a lateral magnification ratio of the optical system, f is a focal distance, HH' is a distance between a principal point on the light source side of an objective lens and that on the optical disk side of the lens.

Here, the thickness on the axis of the objective lens is defined as 0.81 mm, the refractive index of material is 1.486, and a change of the refractive index due to temperature is −12×10⁻⁵/+1° C. When |m| is changed, changes of respective aberration amounts Wt and Wu under the condition that ΔT= 30° C., and ΔU=+1 mm, are shown in FIG. 3. It can be seen from FIG. 3 that: the more |m| is increased, corresponding increase in the aberration occurs.

That is, in the case where the objective lens is glass, the aberration W is caused by ΔU, and $$W=Wu \tag{4}$$

In the case where the objective lens is resin, the aberration W is the sum of the aberration caused by ΔU and that caused by ΔT, and $$W=Wu+Wt \tag{5}$$

As can be seen in FIG. 3, as the lateral magnification ratio is decreased, the influence of ΔT and ΔU is decreased. However, for example, when the lateral magnification ratio is m>−⅙, the NA of the light source side is decreased, and a more powerful laser is necessary for obtaining the required light amount. Further, a certain length of operation distance is necessary, and the distance between an object and an image of the optical system becomes impractically long. In order to make the optical system compact, it is required that the light beam is reflected by a reflection mirror, and this, in turn, increases the cost of the optical system. Conversely, when the lateral magnification ratio is decreased (an absolute value of the lateral magnification ratio is increased), the influence of the change of aberration W is correspondingly increased.

Practically, this influence is discussed on the example of the optical system structured as in FIG. 2(b). For example, a light collecting optical system for a recording and reading optical system for use in a magneto-optical (MO) disk is supposed here, and the objective lens of the optical system having the following characteristics: the NA 0.53, the lateral magnification ratio m=−⅕, and the distance between the object and image U=30 mm, will be considered as follows. Here, the lens is resin in which the refractive index n=1.5031, the lens thickness is 3.25 mm, and the reference design temperature is 25° C. This lens data will be shown in a following table as a comparative example (conventional example). In that table, data of the disk G will also be shown. The aberration of the lens is shown in FIG. 4.

If this optical system can be used as the foregoing light collecting optical system as is, the cost can be greatly reduced compared with the optical system shown in FIG. 2(a). However, as described above, the aberration due to ΔU and ΔT is a problem which must be considered.

Changes of the wave front aberration are shown in FIG. 5 at the time when ΔU is changed from −1 mm to +1 mm in cases where ΔT is −30° C., 0° C. and +30° C.

In FIG. 5, the following can be clearly seen: when ΔT is −30° C. and ΔU is −1 mm, an rms value of the wave front aberration is 0.10 λms; when ΔT is +30° C. and ΔU is +1 mm, an rms value of the wave front aberration is 0.095 λms (in each case, λ=780 nm); and in both cases, the value of the wave front aberration is larger than the Maréchal allowance value even in the axial wave front aberration, and there is the possibility that the performance of the system can not be effective in the environment in which the system is used.

In practice, considering allowances for other characteristics, the value of the aberration is required to be no more than 0.055 λms when ΔT is within the range of ±30° C. and ΔU is ±1 mm, in order to realize the performance of the system.

Based on the above reason, conventionally, for the optical system having a large NA such as a light collecting optical system for a recording and reading optical system which is used for a video disk, mini disk, magneto-optical disk, phase change disk and the like, the optical system in which a collimator lens is provided as shown in FIG. 2(a) is in popular use. However a very expensive lens such as an aspherical lens or a spherical glass lens comprising 1 group 2 element lenses is used for this collimator lens, thereby, the apparatus is more expensive than a compact disk player.

The following optical system has been disclosed in Japanese Patent Publication Open to Public Inspection No. 43,842/1987: a coupling of spherical single lenses is used for reducing the total length of the optical system and allowing for increase in the efficiency of use of the light source beam; and when the imaging magnification of the coupling lens is larger than zero, a value of the wave front aberration is lowered to approximately the same as that of the conventional collimator lens. However, a high NA optical system having an NA more than 0.47 has not been considered yet. Specifically, variations of temperature, and variations of the distance between an object and an image have not been considered yet, resulting in difficulty in realizing a large NA optical system.

An object of the present invention is to obtain an optical system for recording and reading information which has sufficient performance even with variations of temperature and variations of the distance between the object and the image, while maintaining the desired imaging magnification ratio and the distance between the object and the image.

SUMMARY OF THE INVENTION

An optical system for recording and reading information according to the present invention comprises at least a first spherical single lens which is a coupling lens 3, and a second double-sided aspherical lens which is an objective lens 2, numbered from a light source 4 side as shown in FIG. 1. The light source is positioned in the coupling lens side with respect to a focal point on the light source side. The objective lens can be moved along the optical axis for focusing which is one of its several functions, and satisfies the following conditions.

$$0.47 \leq NA \leq 0.65 \tag{6}$$

$$-1.3 \leq mt \leq -\tfrac{1}{6} \tag{7}$$

Where, NA: the number of a numerical aperture on the side of an optical information medium 1 (image side); mt: a lateral magnification ratio of the optical system. Numeral 5 indicates a diaphragm in FIG. 1.

Further, this second objective lens may be moved in a direction perpendicular to the optical axis for tracking, and satisfies the following conditions:

$$0.025 \leq \{(|\Delta_1|+|\Delta_2|)/f_0\}(n-1) \tag{8}$$

Where, $f_0$: a focal length of an objective lens
n: a refractive index of glass of the objective lens
$\Delta_1$: the difference between the position in the direction of the optical axis of the aspherical surface and that of the reference spherical surface having a vertex radius of curvature $r_1$, in a portion closest to the periphery of an effective diameter of the surface on the light source side of the objective lens (a position on the surface of the light source side into which light beams around the lens with the aforementioned NA enter). It is defined as positive when the aspherical surface is more deviated on the light source side as the position on the surface of the lens is at a longer distance from the optical axis.

$\Delta_2$: the difference between the position in the optical axis direction of the aspherical surface and that of the reference spherical surface having a vertex radius of curvature $r_2$, in a portion closest to the periphery of an effective diameter of the surface on the object side of the objective lens (a position on the surface of the light source side into which light beams around the lens with the aforementioned NA enter). It is defined as positive when the aspherical surface is more deviated on the light source side as the position on the surface of the lens is at a longer distance from the optical axis.

When the lateral magnification ratio of the objective lens is assumed as $m_o$, it is desired that $m_o$ satisfies the following conditions: in the case where material of the objective lens is glass, $$-\tfrac{1}{5} \leq m_o \leq -\tfrac{1}{12} \qquad (9)$$

in the case of a resin lens, $$-1/7.5 \leq m_o \leq -\tfrac{1}{12} \qquad (10)$$

Further, when the lateral magnification ratio of the coupling lens, viewed from the side opposite of the light source, is assumed as $m_c$, it is desired that $m_c$ satisfies the following condition:

$$0.48 \leq m_c \leq 0.96 \qquad (11)$$

Here, the following relationship exists among $m_c$, $m_o$, and $m_t$, $m_c = m_o / m_t$.

In the popular optical system shown in FIG. 2(b), the NA, or the magnification ratio must be limited because of the wave front aberration caused by the focusing $\Delta U$ shown by equations (1), (2), (4), and (5), or the wave front aberration caused by temperature difference $\Delta T$ between the environmental temperature and reference design temperature. For this purpose, when the NA on the image side is increased, the lateral magnification ratio $m_t$ of the optical system must be decreased because the wave front aberration W expressed by the equation (4), or the equation (5) in the case of the resin objective lens, has a great influence upon the performance of the system.

In contrast to the above, in the case of the optical system according to the present invention shown in FIG. 1, these influences can be reduced.

To take the case of the glass objective lens as an example, when the lateral magnification ratio of $m_{ts}$ is assumed to be necessary in the optical system shown in FIG. 2(b), the wave front aberration $W_2$ caused by $\Delta U$ from the equation (1) is expressed by the following equation.

$$W_2 = \alpha(|m_{ts}|) \cdot NA^4 \cdot |\Delta U| \qquad (12)$$

In contrast to this, it is assumed that the same lateral magnification ratio $m_{ts}$ is necessary also in the optical system having a composition according to the present invention shown in FIG. 1. In this case, the lateral magnification ratio of the total optical system is $m_{ts}$, only the objective lens is actually operated for focusing, and the coupling lens remains fixed.

That is, only the lateral magnification ratio $m_{os}$ of the objective lens single body influences the wave front aberration. The wave front aberration $W_1$ caused by $\Delta U$ in this optical system is expressed by the following equation.

$$W_1 = \alpha(|m_{os}|) \cdot NA^4 \cdot |\Delta U| \qquad (13)$$

Here, when $m_{cs}$ is assumed to be the magnification ratio of the coupling lens viewed from the side opposite of the light source, the lateral magnification ratio $m_{ts}$ is expressed by the following equation.

$$m_{ts} = m_{os}/m_{cs} \qquad (14)$$

When $|m_{cs}| < 1$, $$|m_{ts}| > |m_{os}| \qquad (15)$$

Because $\alpha(|m|)$ is a monotone increasing function of $|m|$, $$\alpha(|m_{ts}|) > \alpha(|m_{os}|) \qquad (16)$$

Due to the above equations, $$W_2 > W_1 \qquad (17)$$

Accordingly, in the optical system according to the present invention, it has been proven that the wave front aberration caused by $\Delta U$ with respect to the lateral magnification ratio $m_t$ is correspondingly decreased as the lateral magnification ratio $|m_c|$ of the coupling lens viewed from the side opposite of the light source is smaller than 1.

However, in the case where the lateral magnification ratio $m_c$ is zero, that is, the composition of the optical system is near that of the optical system shown in FIG. 2(a), the coupling lens composed of a spherical lens can not maintain the performance of the optical system, and therefore, it is required that the coupling lens is composed of an aspherical lens or two spherical lenses, resulting in the excessive cost.

The condition (6) shows the range of the NA on the image side of this optical system. When the value of the NA exceeds 0.65, even the optical system according to the present invention can not maintain its performance because of the characteristics explained by equations (1) and (2). In the case where the value of the NA is smaller than 0.47, even the optical system shown in FIG. 2(b) can maintain its performance, while the composition of the optical system according to the present invention increases the cost.

In condition (7), when the $m_t$ is more than $-\tfrac{1}{6}$, the amount of light on the light source side is decreased. Accordingly, a high power light source is required, resulting in increased cost. When the $m_t$ is lower than $-\tfrac{1}{3}$, even the optical system according to the present invention can not maintain its performance because of the characteristics explained by equations (1), and (2). Further, the aberration and uneven amount of light remain in the system, and have undesirable influences on the optical system.

In condition (8), when the objective lens having the specified characteristics, within the range of the condition is used, the high NA and the desired lateral magnification ratio of the optical system can be maintained. Here, the objective lens in the example disclosed in Japanese Patent Publication Open to Public Inspection No. 43842/1987 is out of the range.

Condition (9) is applied to a glass lens, and condition (10) is applied to a resin lens. In equation (4), while the upper limit of the allowance range, in which $\Delta U$ does not have any influence on the performance, is $-\tfrac{1}{5}$, the upper limit of the allowance range, in the case where the influence of $\Delta U$ is superimposed on that of $\Delta T$ in the equation (5), is $-1/7.5$.

Further, when the limit is larger than $-\tfrac{1}{12}$, the performance of the coupling lens can not be maintained because of condition (7).

In condition (11), because the objective lens having a high NA is considered in this specification, when the magnification ratio of the coupling lens viewed from the side opposite of the light source is smaller than 0.48, the coupling lens composed of a single spherical surface lens can not maintain its performance. Further, when the lateral magnification ratio of the coupling lens is larger than 0.96, the burden of the objective lens is further increased, and accordingly, this optical system is ineffective.

BRIEF DESCRIPTION OF THE DRAWINGS

FIG. 2(a), FIG. 2(b), and FIG. 2(c) are sectional views showing an representative example of the composition of a conventional optical system for recording and reading information.

FIG. 3 is a graph showing a change of a wave front aberration in correspondence with each magnification under the condition that the temperature difference between the reference design temperature and the working temperature $\Delta T= 30°$ C., and a deviation of the distance between the object and the image $\Delta U=1$, in the optical system shown in FIG. 2(b).

FIG. 4 is a view showing an aberration curve of the optical system shown in FIG. 2(b).

DETAILED DESCRIPTION OF THE INVENTION

Examples of the present invention will be described as follows: Symbols in the following table are defined as follows:

ri: a vertex curvature radius of the "i" lens surface numbered from a light source side, di: a face separation of the "i" lens numbered from the light source side, and hi: a refractive index of glass material of the "i" lens numbered from the light source side. The aspherical shape is expressed by the following equation under the condition that one vertex of the lens surface is an origin, the curvature of the vertex is C, the conical coefficient is K, the aspherical surface coefficient is Ai, and the exponent of the aspherical surface is Pi (Pi>2): [Equation 1]

$$X = \frac{C\phi^2}{1+\sqrt{1-(1+K)C^2\phi^2}} + \sum_i A_i \phi^{P_i}$$

$$\phi = \sqrt{y^2+z^2}, \quad C = 1/r$$

Further, $f_c$ is a focal length of a coupling lens, $f_o$ is a focal length of the objective lens, NA is the number of numerical apertures of the optical system viewed from the optical recording medium side (image side), $m_c$ is an imaging magnification ratio of the coupling lens, $m_o$ is an imaging magnification ratio of the objective lens, $m_t$ is an imaging magnification ratio of the total system, and the imaging magnification ratio of the coupling lens is the imaging magnification ratio viewed from the side opposite of the light source. When $m_c \neq 0$, and the objective lens is under the reference design conditions, the following relationship is formed among $m_c$, $m_o$, $m_t$.

$$m_t = m_o/m_c$$

U is a distance from the light source to the recording surface of the optical recording medium, that is to say, the reference distance between an object and an image. A value concerning disk G is also shown in the table.

Examples 1, 2 and 3 are cases in which the imaging magnification ratio (lateral magnification ratio) of the objective lens is −0.1167, and a resin objective lens having the NA of 0.53 is used.

In example 1, the coupling lens having the imaging magnification ratio $m_c=0.538$ is combined with the above objective lens, and the imaging magnification ratio $m_t=-0.2$, and the distance between the object and the image U=30.00.

In example 2, the coupling lens having the imaging magnification ratio $m_c=0.7001$ is combined with the above objective lens, and the imaging magnification ratio $m_t=-0.1667$, and the distance between the object and the image U= 32.00.

Figure 6:
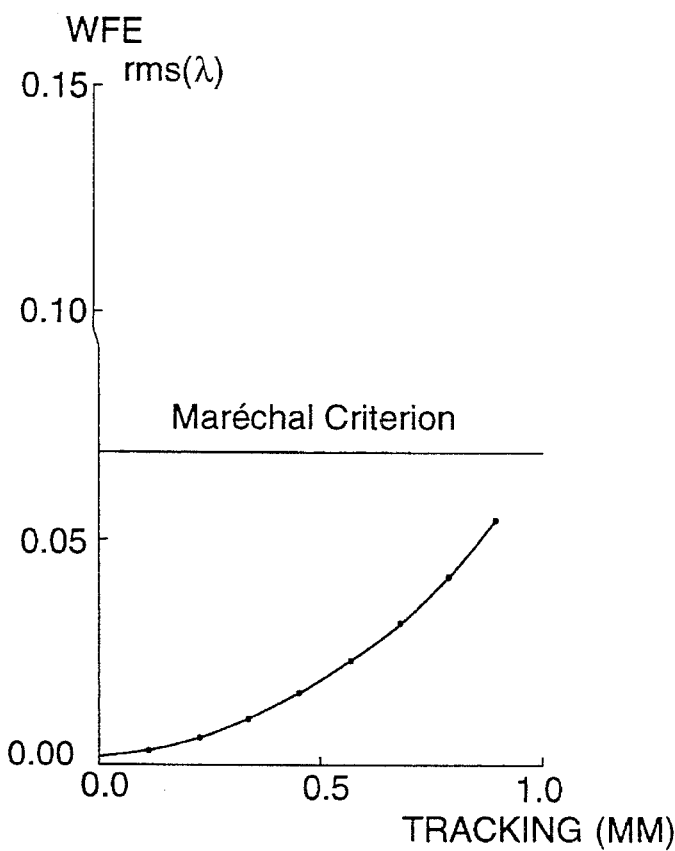
FIG. 6 is a view showing the wave front aberration in tracking positions in the example 1 of the optical system for used with recording and reading information on the optical recording medium according to the present invention.
Figure 7:
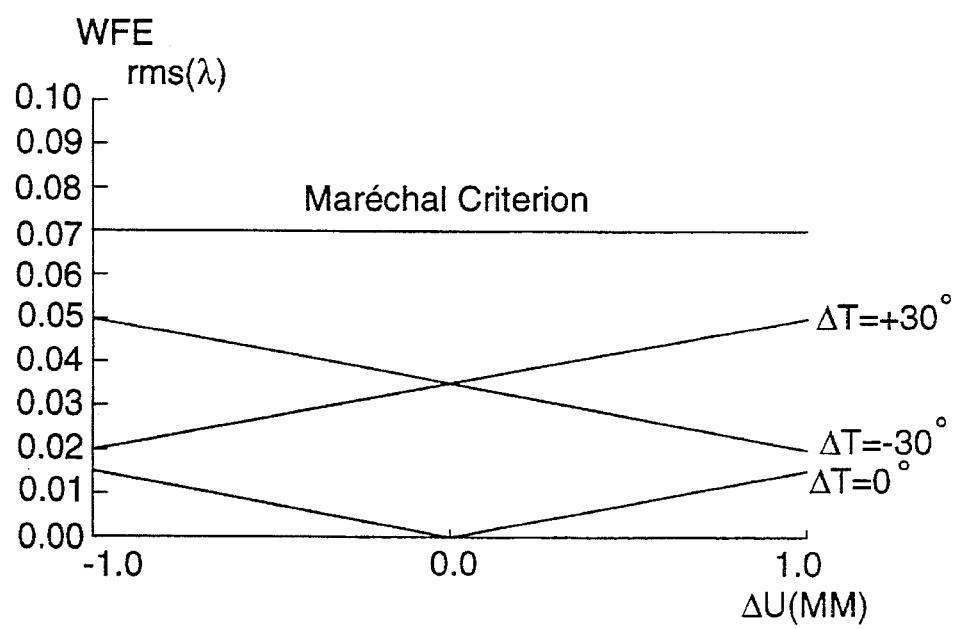
FIG. 7 is a view showing a change of the wave front aberration caused by a deviation of the distance between the object and the image in temperature differences between the reference design temperature and the working temperature, +30° C., 0° C., −30° C., in example 1 of the optical system for use with recording and reading information on the optical recording medium according to the present invention.
Figure 8:
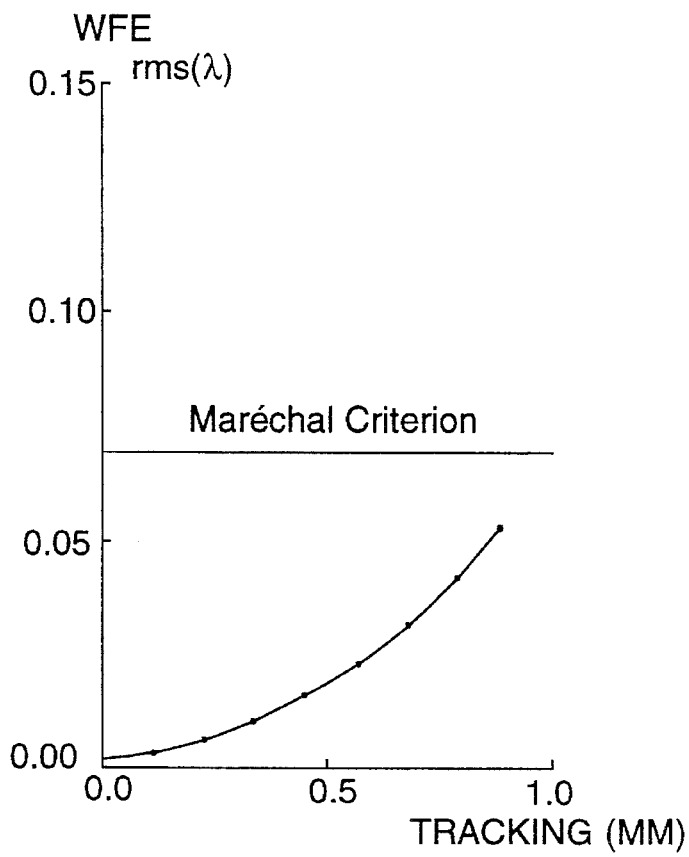
FIG. 8 is a view showing the wave front aberration in tracking positions in the example 2 of the optical system for use with recording and reading information on the optical recording medium according to the present invention.
Figure 9:
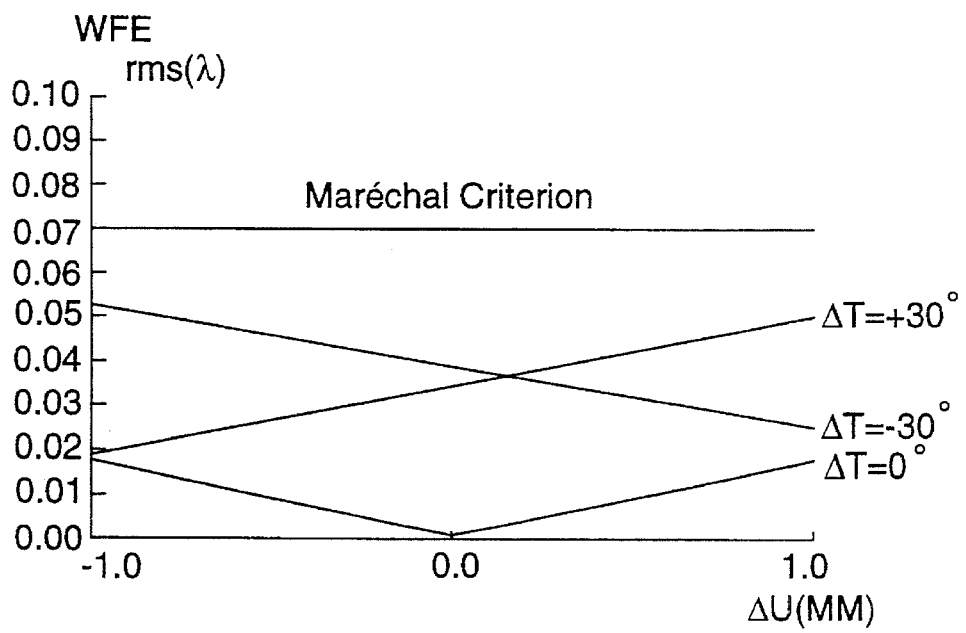
FIG. 9 is a view showing a change of the wave front aberration caused by a deviation of the distance between the object and the image in temperature differences between the reference design temperature and the working temperature, +30° C., 0° C., −30° C., in the example 2 of the optical system for use with recording and reading information on the optical recording medium according to the present invention.

Tracking characteristics in examples 1 and 2 (a change in the wave front aberration when the objective lens is moved in a perpendicular direction to the optical axis) are shown in FIG. 6 and FIG. 8 respectively. Changes in the aberration due to the difference of the distance ΔU between the distance between an object and an image, and the reference distance between an object and an image in the temperature differences of the working temperature with respect to the reference temperature, −30° C., 0° C., +30° C., are shown in FIG. 7 and FIG. 9.

In this connection, when the temperature rises 1° C., the refractive index of resin is decreased by 12×10⁻⁵. This change in the refractive index has an influence on the change in the wave front aberration due to the temperature. The reference design temperature is 25° C. The change in the refractive index of the resin due to the temperature, and the reference design temperature are conditions common to examples 1 to 6.

Figure 1:
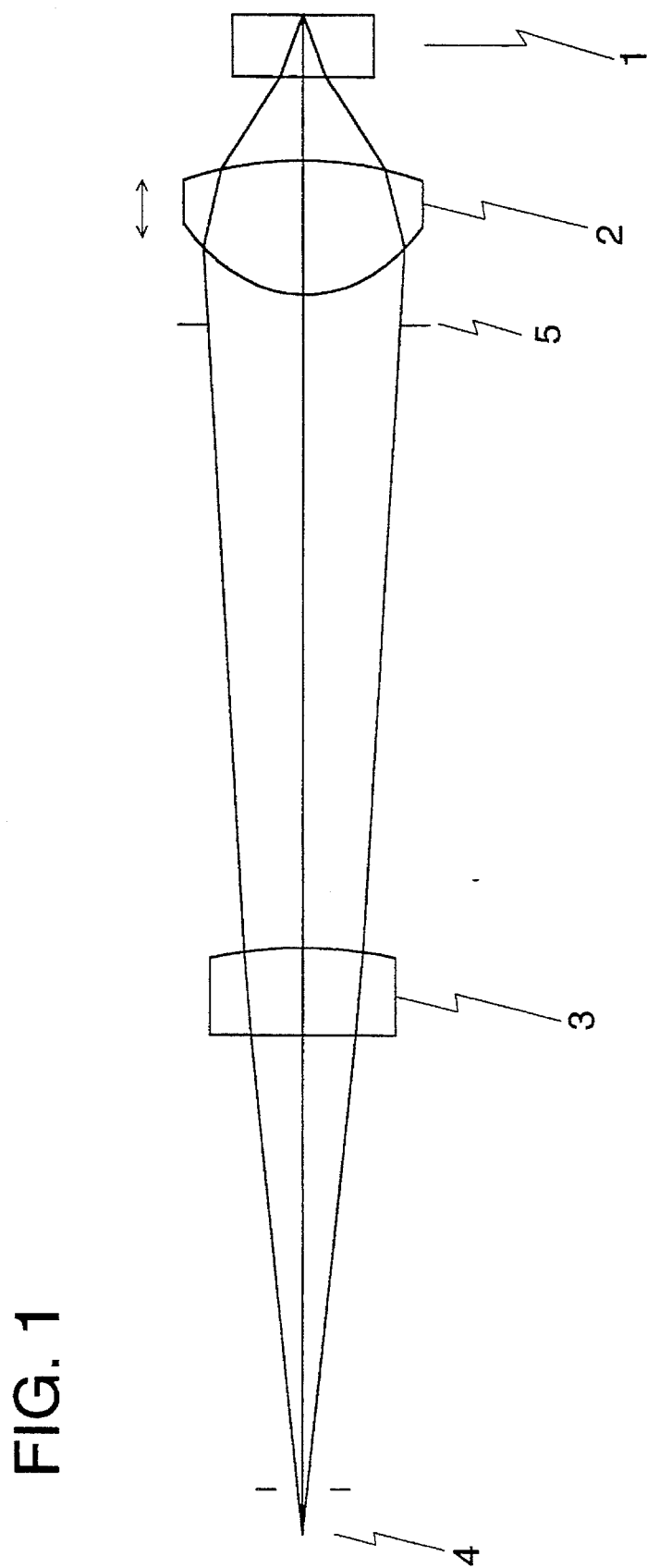
FIG. 1 is a sectional view showing the composition of an optical system for use with recording and reading information on an optical recording medium according to the present invention.
Figure 5:
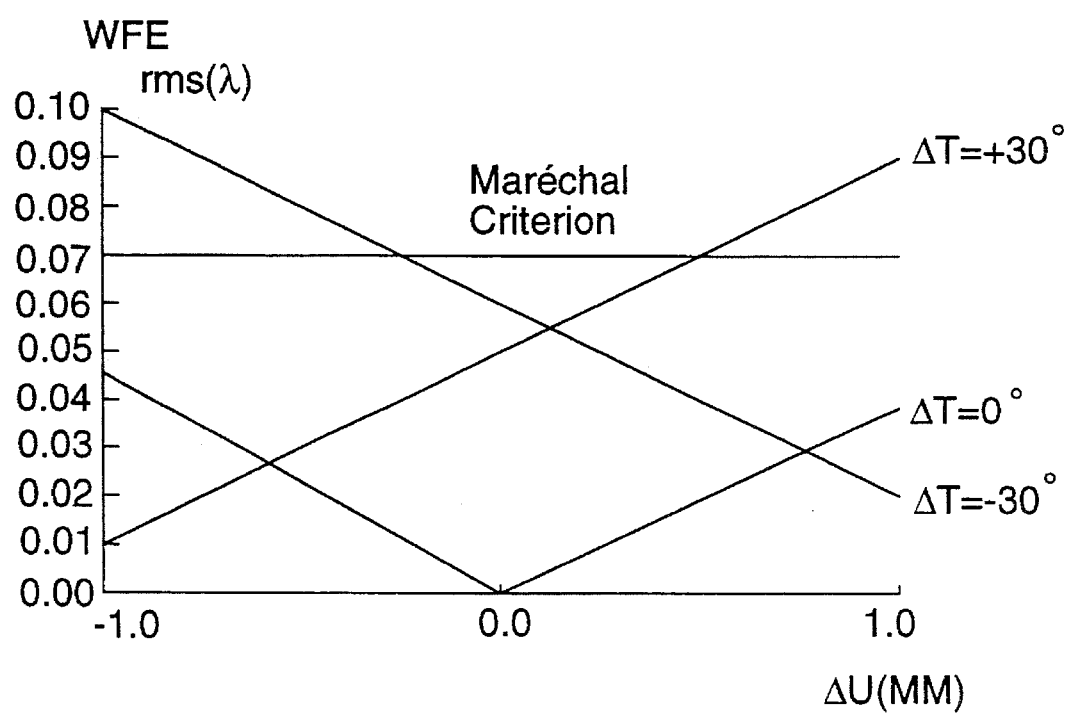
FIG. 5 is a view showing a change of the wave front aberration caused by a deviation of the distance between an object and an image in temperature differences between the reference design temperature and the working temperature, +30° C., 0° C., −30° C., in the optical system shown in FIG. 2(b).

From FIG. 7, the following can be seen: the maximum changed value in the wave front aberration is within the range of 0.05 λ under the above conditions, and is a half of the changed value in the wave front aberration when compared with that in FIG. 5, in the case where U=30, and $m_t=-0.2$, which fully satisfies the specification. The same result can be seen from FIG. 9.

Figure 10:
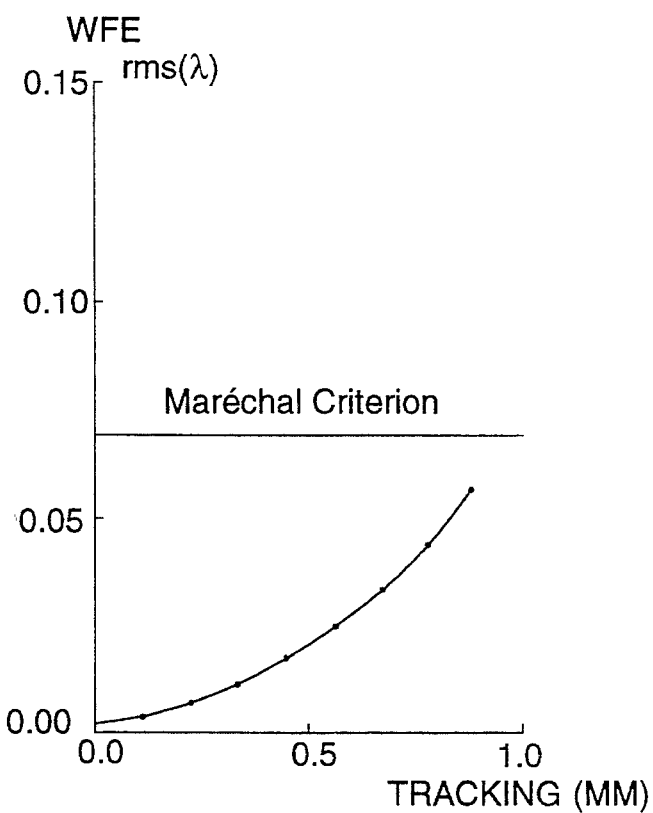
FIG. 10 is a view showing the wave front aberration in tracking positions in example 3 of the optical system for use with recording and reading information on the optical recording medium according to the present invention.

In example 3, the imaging magnification ratio of the coupling lens $m_c=0.4995$, the total magnification ratio of the optical system $m_t=-0.2336$, and U=23, which are relatively small. This tracking characteristic is shown in FIG. 10, and a change of the aberration due to ΔU in each of the aforementioned temperature is shown in FIG. 11.

Figure 11:
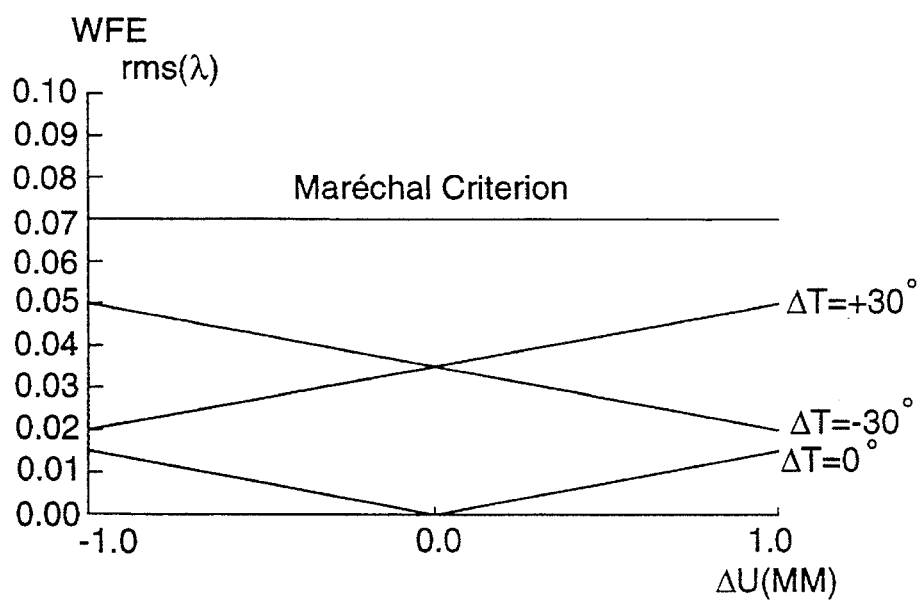
FIG. 11 is a view showing a change of the wave front aberration caused by a deviation of the distance between the object and the image in temperature differences between the reference design temperature and the working temperature, +30° C., 0° C., −30° C., in the example 3 of the optical system for use with recording and reading information on the optical recording medium according to the present invention.

As described above, even in the case where the magnification ratios are relatively small, it can be seen from FIG. 11 that the maximum wave front aberration is within the range of 0.055 λ, which can be used without any trouble.

In examples 4 and 5, the objective lens of this optical system is made of resin, the NA is 0.53, and the imaging magnification ratio of the objective lens $m_o=-0.1333$, which is relatively small.

In example 4, the imaging magnification ratio of the coupling lens $m_c=0.6667$, the total magnification ratio of the optical system $m_t=-0.2$, and the distance between the object and the image U=26.00.

In example 5, the optical system is used in the case where the influence due to the coupling lens is relatively small, in which the imaging magnification ratio of the coupling lens $m_c=0.8$, and the total imaging magnification ratio of the optical system $m_t=-0.1666$, and the distance between the object and the image U=29.5.

In example 6, the imaging magnification ratio of the resin objective lens $m_o=-0.0833$, which is relatively large, the NA is 0.53, and the imaging magnification ratio of the coupling lens $m_c=-0.5$, which is a case where the influence of the coupling lens is relatively large. The total imaging magnification ratio of the optical system $m_t=-0.1667$, and the distance between the object and the image U=29.00.

Figure 12:
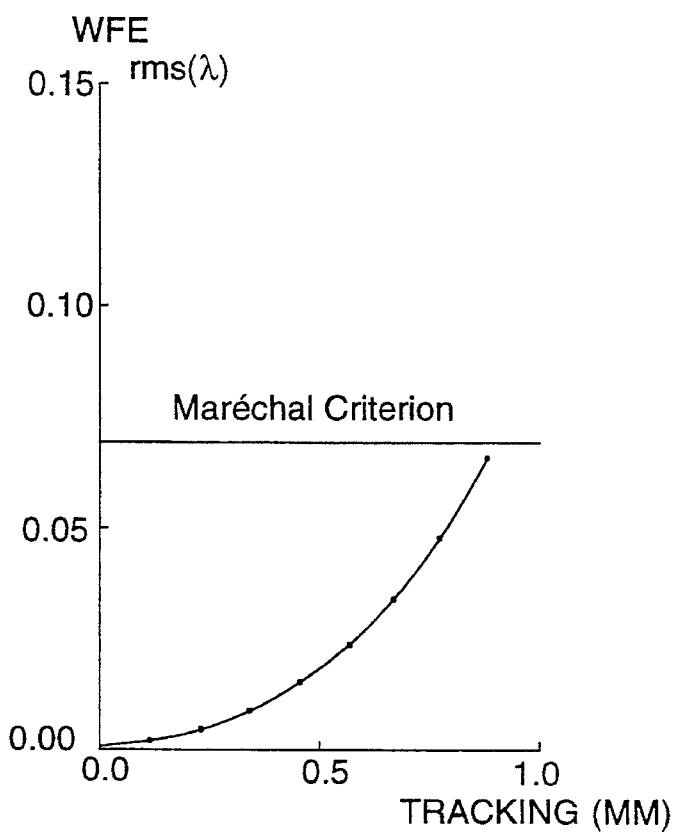
FIG. 12 is a view showing the wave front aberration in tracking positions in example 4 of the optical system for use with recording and reading information on the optical recording medium according to the present invention.
Figure 13:
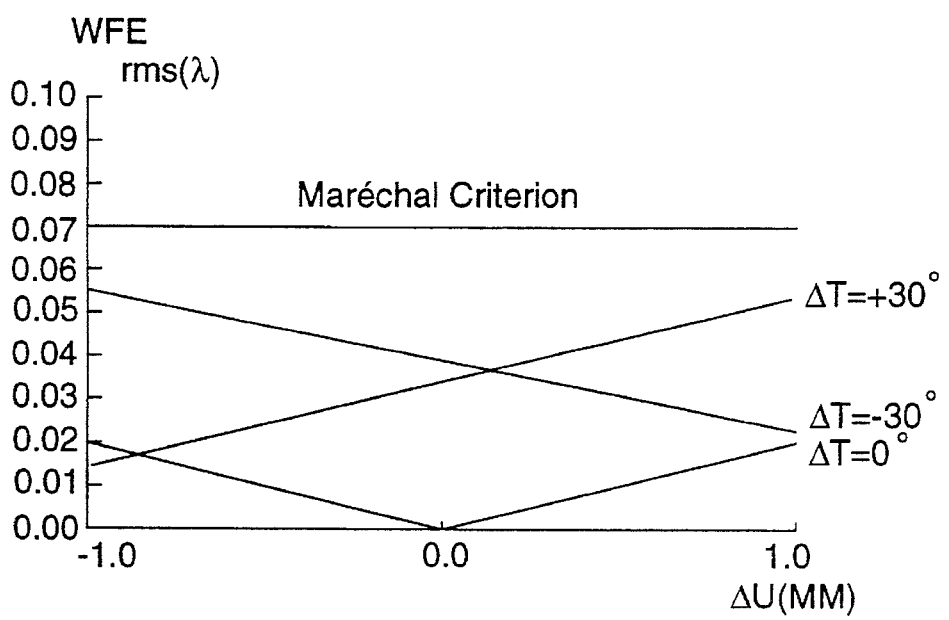
FIG. 13 is a view showing a change of the wave front aberration caused by a deviation of the distance between the object and the image in temperature differences between the reference design temperature and the working temperature, +30° C., 0° C., −30° C., in example 4 of the optical system for use with recording and reading information on the optical recording medium according to the present invention.
Figure 14:
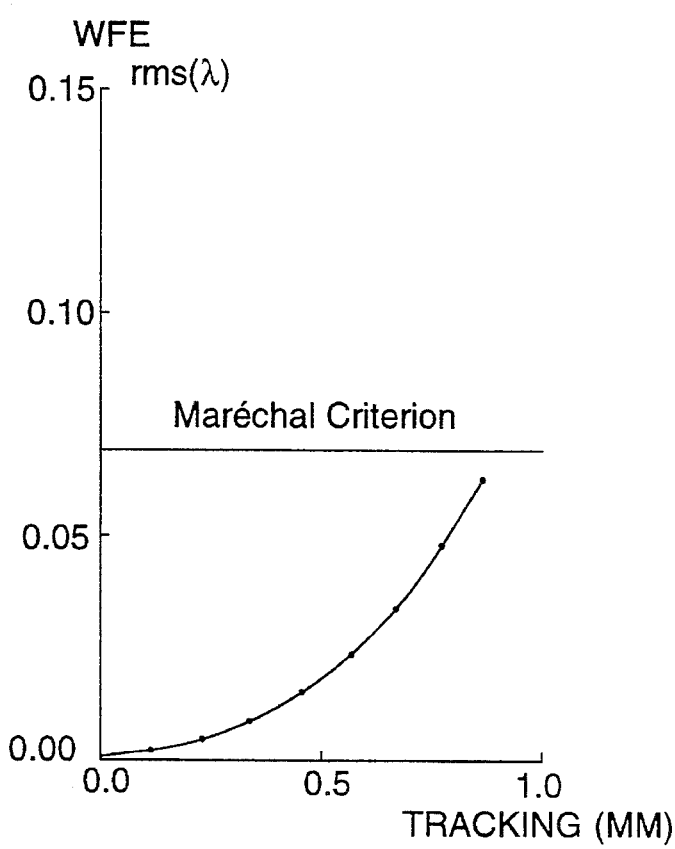
FIG. 14 is a view showing the wave front aberration in tracking positions in example 5 of the optical system for use with recording and reading information on the optical recording medium according to the present invention.
Figure 15:
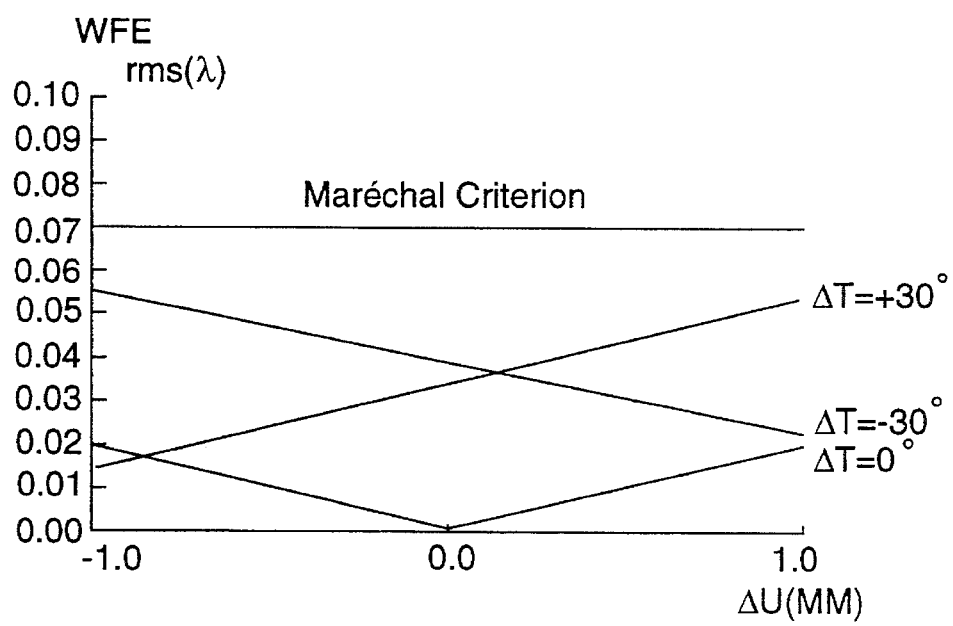
FIG. 15 is a view showing a change of the wave front aberration caused by a deviation of the distance between the object and the image in temperature differences between the reference design temperature and the working temperature, +30° C., 0° C., −30° C., in example 5 of the optical system for use with recording and reading information on the optical recording medium according to the present invention.
Figure 16:
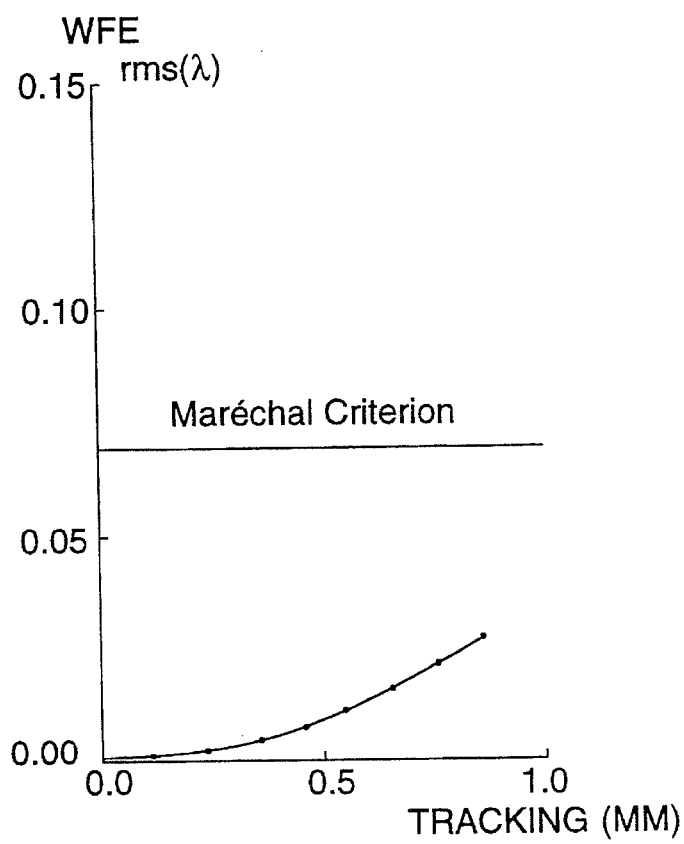
FIG. 16 is a view showing the wave front aberration in tracking positions in example 6 of the optical system for use with recording and reading information on the optical recording medium according to the present invention.
Figure 17:
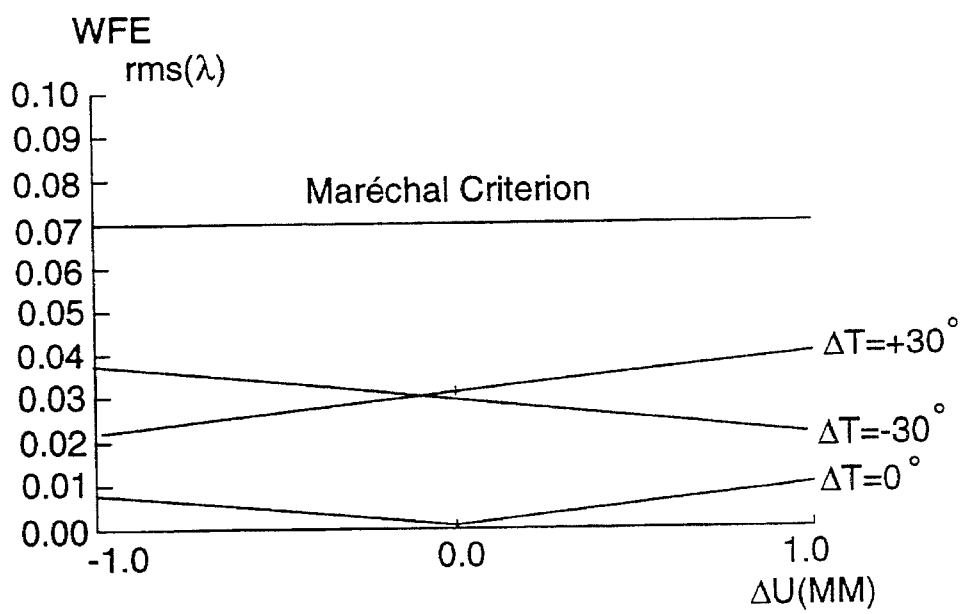
FIG. 17 is a view showing a change of the wave front aberration caused by a deviation of the distance between the object and the image in temperature differences between the reference design temperature and the working temperature, +30° C., 0° C., −30° C., in example 6 of the optical system for use with recording and reading information on the optical recording medium according to the present invention.

The tracking characteristics in examples 4, 5, and 6 are respectively shown in FIGS. 12, 14, and 16. A change of the wave front aberration due to ΔU in each aforementioned temperature is respectively shown in FIGS. 13, 15 and 17.

From the tracking characteristics in examples 1 to 6, it can be seen that the spherical aberration of the coupling lens has a slight influence on a change of the wave front aberration due to tracking, and in the same NA, the imaging magnification ratio of the objective lens $m_o$ has a great influence on the tracking characteristics. Further, from the ΔU characteristics in the reference design temperature, it can be seen that the imaging magnification ratio of the objective lens $m_o$ has a great influence on the ΔU characteristics.

Figure 18:
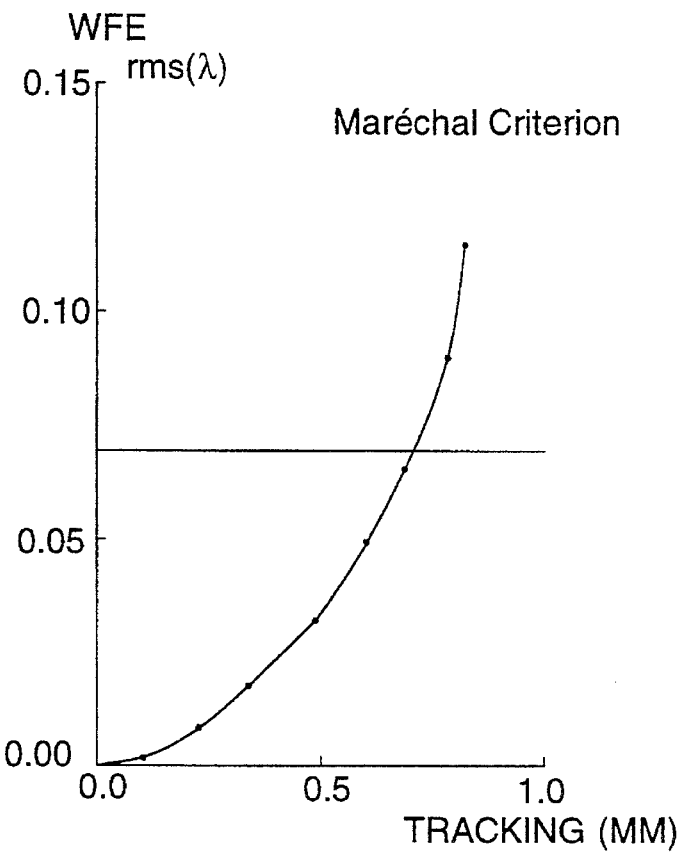
FIG. 18 is a view showing the wave front aberration in tracking positions in example 7 of the optical system for use with recording and reading information on the optical recording medium according to the present invention.
Figure 19:
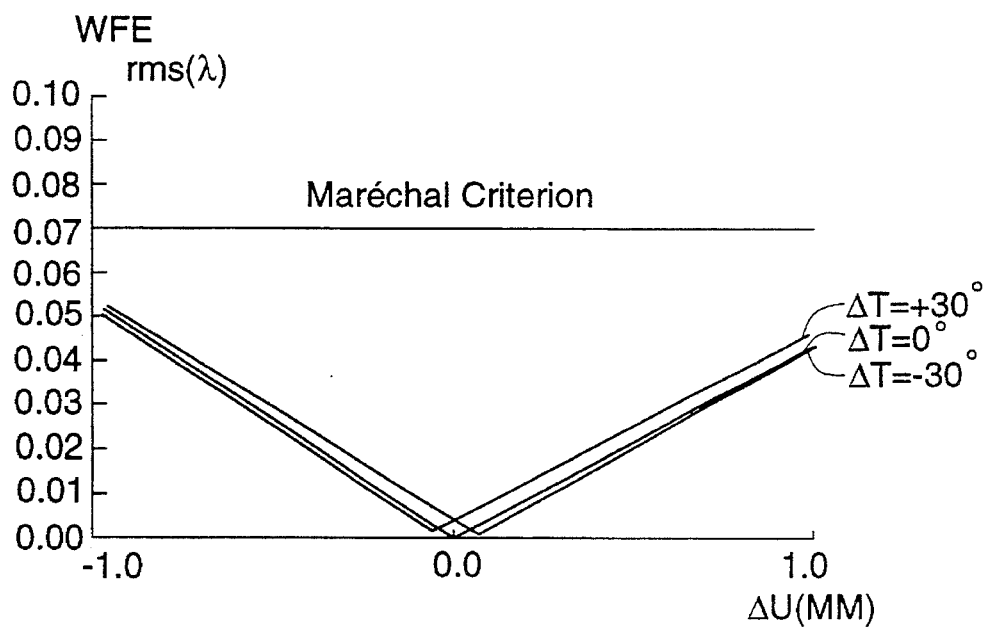
FIG. 19 is a view showing a change of the wave front aberration caused by a deviation of the distance between the object and the image in temperature differences between the reference design temperature and the working temperature, +30° C., 0° C., −30° C., in example 7 of the optical system for use with recording and reading information on the optical recording medium according to the present invention.

In example 7, the NA is 0.6, which is very large, the objective lens in the optical system is made of glass, and its imaging magnification ratio $m_o=-0.1600$. The imaging magnification ratio of the coupling lens $m_c=0.8$, and the total image magnification ratio of the optical system $m_t= -0.2$. The tracking characteristics of the optical system are shown in FIG. 18, and the change of the wave front aberration due to ΔU in each aforementioned temperature is shown in FIG. 19.

At this time, the refractive index of the glass lens is lowered by 6×10⁻⁸ per 1° C. increase of temperature. This value is approximately 1/50 of the resin lens. In practice, even when the temperature changes by 30° C. from the reference design temperature, the wave front aberration changes by only 0.002 λ. Due to the foregoing, it can be seen that the wave front aberration is seldom changed due to temperature difference. Accordingly, as clearly seen from the comparison of FIG. 11 with FIG. 19, the allowance value of a change of the wave front aberration due to ΔU can be increased. Further, from FIG. 11, it can be seen that even when the objective lens has an NA of 0.6, and $m_t=-0.2$, this optical system can be used without any influence on the performance of the total system.

| Conventional example | | | |
|---|---|---|---|
| f = 4.01 | m = −0.2000 | NA 0.53 | U = 30.00 |

| Surface number | r | d | n |
|---|---|---|---|
| 1 | 2.755 | 3.25 | 1.50310 |
| 2 | −4.558 | 0.110 | |
| 3 G | ∞ | 1.25 | 1 51072 |
| 4 | ∞ | | |

Aspherical coefficient

The first surface $K = -8.66030 \times 10^{-1}$
$A_1 = 5.47490 \times 10^{-4}$   $P_1 = 4.0000$
$A_2 = -8.45380 \times 10^{-5}$   $P_2 = 6.0000$
$A_3 = 3.93280 \times 10^{-6}$   $P_3 = 8.0000$
$A_4 = -6.92650 \times 10^{-7}$   $P_4 = 10.0000$ The second surface $K = -10.26800$
$A_1 = -5.85600 \times 10^{-4}$   $P_1 = 4.0000$
$A_2 = 7.50180 \times 10^{-5}$   $P_2 = 6.0000$
$A_3 = -1.52810 \times 10^{-5}$   $P_3 = 8.0000$
$A_4 = 7.57220 \times 10^{-7}$   $P_4 = 10.0000$ Example 1

| fc = 26.45 | fo = 3.410 | NA 0.53 |
|---|---|---|
| mc = 0.5834 | mo = −0.1167 | mt = −0.2000 |
| U = 30.00 | | |

| Surface number | r | d | n |
|---|---|---|---|
| 1 | −59.952 | 1.50 | 1.51072 |
| 2 | −11.119 | 12.90 | |
| 3 | 2.285 | 2.75 | 1.50310 |
| 4 | −4.063 | 0.50 | |
| 5 G | ∞ | 1.25 | 1.51072 |
| 6 | ∞ | | |

Aspherical coefficient

The third surface $K = -7.75560 \times 10^{-1}$
$A_1 = 1.00370 \times 10^{-3}$   $P_1 = 4.0000$
$A_2 = -1.18490 \times 10^{-4}$   $P_2 = 6.0000$
$A_3 = 5.69630 \times 10^{-7}$   $P_3 = 8.0000$
$A_4 = -3.56810 \times 10^{-6}$   $P_4 = 10.0000$ The fourth surface $K = -11.94200$
$A_1 = 4.72190 \times 10^{-4}$   $P_1 = 4.0000$
$A_2 = -2.54210 \times 10^{-4}$   $P_2 = 6.0000$
$A_3 = -4.89890 \times 10^{-7}$   $P_3 = 8.0000$
$A_4 = 2.26100 \times 10^{-6}$   $P_4 = 10.0000$ Example 2

| fc = 45.70 | fo = 3.410 | NA 0.53 |
|---|---|---|
| mc = 0.7001 | mo = −0.1167 | mt = −0.1667 |
| U = 32.00 | | |

| Surface number | r | d | n |
|---|---|---|---|
| 1 | −51.060 | 1.50 | 1.51072 |
| 2 | −16.177 | 12.50 | |
| 3 | 2.285 | 2.75 | 1.50310 |
| 4 | −4.063 | 0.50 | |
| 5 G | ∞ | 1.25 | 1.51072 |
| 6 | ∞ | | |

Aspherical coefficient

The third surface $K = -7.75560 \times 10^{-1}$
$A_1 = 1.00370 \times 10^{-3}$   $P_1 = 4.0000$
$A_2 = -1.18490 \times 10^{-4}$   $P_2 = 6.0000$
$A_3 = 5.69630 \times 10^{-7}$   $P_3 = 8.0000$
$A_4 = -3.56810 \times 10^{-6}$   $P_4 = 10.0000$ The fourth surface $K = -11.94200$
$A_1 = 4.72190 \times 10^{-4}$   $P_1 = 4.0000$
$A_2 = -2.54210 \times 10^{-4}$   $P_2 = 6.0000$
$A_3 = -4.89890 \times 10^{-7}$   $P_3 = 8.0000$
$A_4 = 2.26100 \times 10^{-6}$   $P_4 = 10.0000$ Example 3

| fc = 29.24 | fo = 3.410 | NA 0.53 |
|---|---|---|
| mc = 0.4995 | mo = −0.1167 | mt = −0.2336 |
| U = 23.00 | | |

| Surface number | r | d | n |
|---|---|---|---|
| 1 | −26.224 | 1.50 | 1.51072 |
| 2 | −9.700 | 2.58 | |
| 3 | 2.285 | 2.75 | 1.50310 |
| 4 | −4.063 | 0.50 | |
| 5 G | ∞ | 1.25 | 1.51072 |
| 6 | ∞ | | |

Aspherical coefficient

The third surface $K = -7.75560 \times 10^{-1}$
$A_1 = 1.00370 \times 10^{-3}$   $P_1 = 4.0000$
$A_2 = -1.18490 \times 10^{-4}$   $P_2 = 6.0000$
$A_3 = 5.69630 \times 10^{-7}$   $P_3 = 8.0000$
$A_4 = -3.56810 \times 10{-6}$   $P_4 = 10.0000$ The fourth surface $K = -11.94200$
$A_1 = 4.72190 \times 10^{-4}$   $P_1 = 4.0000$
$A_2 = -2.54210 \times 10^{-4}$   $P_2 = 6.0000$
$A_3 = -4.89890 \times 10^{-7}$   $P_3 = 8.0000$
$A_4 = 2.26100 \times 10^{-6}$   $P_4 = 10.0000$ Example 4

| fc = 33.08 | fo = 3.116 | NA 0.53 |
|---|---|---|
| mc = 0.6667 | mo = −0.1333 | mt = −0.20 |
| U = 26.00 | | |

| Surface number | r | d | n |
|---|---|---|---|
| 1 | −26.982 | 1.50 | 1.51072 |
| 2 | −10.584 | 9.70 | |
| 3 | 2.120 | 2.55 | 1.50310 |
| 4 | −3.597 | 0.50 | |
| 5 G | ∞ | 1.25 | 1.51072 |
| 6 | ∞ | | |

Aspherical coefficient

The third surface $K = -8.35080 \times 10^{-1}$
$A_1 = 1.62680 \times 10^{-3}$   $P_1 = 4.0000$
$A_2 = -1.80390 \times 10^{-4}$   $P_2 = 6.0000$
$A_3 = -2.77080 \times 10^{-6}$   $P_3 = 8.0000$
$A_4 = -5.81520 \times 10^{-6}$   $P_4 = 10.0000$ The fourth surface $K = -10.79300$
$A_1 = 7.24270 \times 10^{-5}$   $P_1 = 4.0000$
$A_2 = -2.49900 \times 10^{-4}$   $P_2 = 6.0000$
$A_3 = -5.22120 \times 10^{-6}$   $P_3 = 8.0000$ -continued

| $A_4 = 3.38660 \times 10^{-6}$ | $P_4 = 10.0000$ |

Example 5

| fc = 40.97 | fo = 3.116 | NA 0.53 |
| mc = 0.80 | mo = −0.1333 | mt = −0.1666 |
| U = 29.5 | | |

| Surface number | r | d | n |
|---|---|---|---|
| 1 | −25.137 | 1.50 | 1.51072 |
| 2 | −11.649 | 16.30 | |
| 3 | 2.120 | 2.55 | 1.50310 |
| 4 | −3.597 | 0.50 | |
| 5 G | ∞ | 1.25 | 1.51072 |
| 6 | ∞ | | |

Aspherical coefficient

The third surface

| $K = -8.35080 \times 10^{-1}$ | |
| $A_1 = 1.62680 \times 10^{-3}$ | $P_1 = 4.0000$ |
| $A_2 = -1.80390 \times 10^{-4}$ | $P_2 = 6.0000$ |
| $A_3 = -2.77080 \times 10^{-6}$ | $P_3 = 8.0000$ |
| $A_4 = -5.81520 \times 10^{-6}$ | $P_4 = 10.0000$ |

The fourth surface

| $K = -10.79300$ | |
| $A_1 = 7.24270 \times 10^{-5}$ | $P_1 = 4.0000$ |
| $A_2 = -2.49900 \times 10^{-4}$ | $P_2 = 6.0000$ |
| $A_3 = -5.22120 \times 10^{-6}$ | $P_3 = 8.0000$ |
| $A_4 = 3.38660 \times 10^{-6}$ | $P_4 = 10.0000$ |

Example 6

| fc = 42.56 | fo = 3.476 | NA 0.53 |
| mc = 0.5 | mo = −0.0833 | mt = −0.1667 |
| U = 29.00 | | |

| Surface number | r | d | n |
|---|---|---|---|
| 1 | −31.100 | 1.50 | 1.51072 |
| 2 | −13.002 | 2.10 | |
| 3 | 2.300 | 2.75 | 1.50310 |
| 4 | −4.375 | 0.50 | |
| 5 G | ∞ | 1.25 | 1.51072 |
| 6 | ∞ | | |

Aspherical coefficient

The third surface

| $K = -7.92790 \times 10^{-1}$ | |
| $A_1 = 1.56600 \times 10^{-3}$ | $P_1 = 4.0000$ |
| $A_2 = -2.00970 \times 10^{-5}$ | $P_2 = 6.0000$ |
| $A_3 = -7.51990 \times 10^{-6}$ | $P_3 = 8.0000$ |
| $A_4 = -2.54490 \times 10^{-6}$ | $P_4 = 10.0000$ |

The fourth surface

| $K = -12.12100$ | |
| $A_1 = 2.91210 \times 10^{-3}$ | $P_1 = 4.0000$ |
| $A_2 = -1.09730 \times 10^{-3}$ | $P_2 = 6.0000$ |
| $A_3 = 1.71110 \times 10^{-4}$ | $P_3 = 8.0000$ |
| $A_4 = -1.22100 \times 10^{-5}$ | $P_4 = 10.0000$ |

Example 7

| fc = 101.37 | fo = 3.396 | NA 0.6 |
| mc = 0.8 | mo = −0.16 | mt = −0.2 |
| U = 25.50 | | |

| Surface number | r | d | n |
|---|---|---|---|
| 1 | −12.539 | 1.20 | 1.51072 |
| 2 | −10.421 | 2.02 | |
| 3 | 2.855 | 3.30 | 1.68468 |
| 4 | 6.641 | 0.10 | |
| 5 G | ∞ | 1.25 | 1.51072 |
| 6 | ∞ | | |

Aspherical coefficient

The third surface

| $K = -1.1638$ | |
| $A_1 = 2.56720 \times 10^{-3}$ | $P_1 = 4.0000$ |
| $A_2 = 1.23690 \times 10^{-6}$ | $P_2 = 6.0000$ |
| $A_3 = -2.81990 \times 10^{-6}$ | $P_3 = 8.0000$ |
| $A_4 = -6.28430 \times 10^{-7}$ | $P_4 = 10.0000$ |

The fourth surface

| $K = -19.70300$ | |
| $A_1 = 3.84770 \times 10^{-3}$ | $P_1 = 4.0000$ |
| $A_2 = -9.98580 \times 10^{-4}$ | $P_2 = 6.0000$ |
| $A_3 = 1.16660 \times 10^{-4}$ | $P_3 = 8.0000$ |
| $A_4 = -6.29930 \times 10^{-6}$ | $P_4 = 10.0000$ |

The optical system for use with recording and reading information on an optical recording medium according to the present invention comprises a spherical coupling lens and a resin imaging lens, which is of a simple construction, and has a high NA. As can be seen from the description and drawings of each example, in spite of the foregoing composition, the maximum wave front aberration is within the range of 0.05 λ under the condition that ΔT is within the range of ±30° C., and ΔU is within the range of ±1 mm. The result is within the range of the Maréchal Criterion, and sufficiently satisfies the specifications.

What is claimed is:

1. An optical system for recording and reading information on an optical information medium, comprising:

a light source for irradiating the optical information medium with a light beam through a coupling lens and a objective lens;

said coupling lens which is a spherical single lens; and said objective lens which is a double-sided aspherical lens and provided movable along an optical axis of said light source;

wherein said light source is located between said coupling lens and a focal point, at a side of said light source, of said coupling lens; and said optical system satisfying:

$$0.47 \leq NA \leq 0.65$$

$$-\tfrac{1}{3} \leq mt \leq -\tfrac{1}{6}$$

wherein NA is the number of a numerical aperture on a side of said optical information medium, and mt is a lateral magnification ratio of said optical system.

2. The optical system of claim 1, wherein said objective lens is made of a glass material; and said optical system satisfying:

$$-\tfrac{1}{5} \leq mo \leq -\tfrac{1}{12} \times$$

$$0.025 \leq \{(|\Delta_1| + |\Delta_2|)/f_o\} (n-1)$$

wherein mo is a lateral magnification ratio of said objective lens;

$f_o$ is a focal length of said objective lens;

n is a refractive index of said glass material;

$\Delta_1$ is, in a portion closest to a periphery of an effective diameter of said objective lens on said side of said light source, a difference between a position of an aspherical surface in a direction of said optical axis and that of a first reference spherical surface having a vertex radius of curvature $r_1$, wherein it is defined as positive when said aspherical surface is more deviated on said side of said light source as a position on said aspherical surface is at a longer distance from said optical axis; and $\Delta_2$ is, in a portion closest to a periphery of an effective diameter of said objective lens on said side of said optical information medium, a difference between a position of an aspherical surface in said direction of said optical axis and that of a second reference spherical surface having a vertex radius of curvature $r_2$, wherein it is defined as positive when said aspherical surface is more deviated on said side of said light source as a position on said aspherical surface is at a longer distance from said optical axis.

3. The optical system of claim 1, wherein said objective lens is made of a resin material; and said optical system satisfying:

$-1/7.5 \leq mo \leq -1/12$ $0.025 \leq \{(|\Delta_1|+|\Delta_2|)/f_0\} (n-1)$ wherein mo is a lateral magnification ratio of said objective lens;

$f_0$ is a focal length of said objective lens;

n is a refractive index of said resin material;

$\Delta_1$ is, in a portion closest to a periphery of an effective diameter of said objective lens on said side of said light source, a difference between a position of an aspherical surface in a direction of said optical axis and that of a first reference spherical surface having a vertex radius of curvature $r_1$, wherein it is defined as positive when said aspherical surface is more deviated on said side of said light source as a position on said aspherical surface is at a longer distance from said optical axis; and $\Delta_2$ is, in a portion closest to a periphery of an effective diameter of said objective lens on said side of said optical information medium, a difference between a position of an aspherical surface in said direction of said optical axis and that of a second reference spherical surface having a vertex radius of curvature $r_2$, wherein it is defined as positive when said aspherical surface is more deviated on said side of said light source as a position on said aspherical surface is at a longer distance from said optical axis.

4. The optical system of claim 1, further satisfying:

$0.48 \leq mc \leq 0.96$ wherein mc is a lateral magnification ratio of said coupling lens.

* * * * *